April 18, 1939.  D. E. OLSHEVSKY  2,154,862
GAS ANALYSIS APPARATUS
Filed Feb. 12, 1937  2 Sheets-Sheet 1
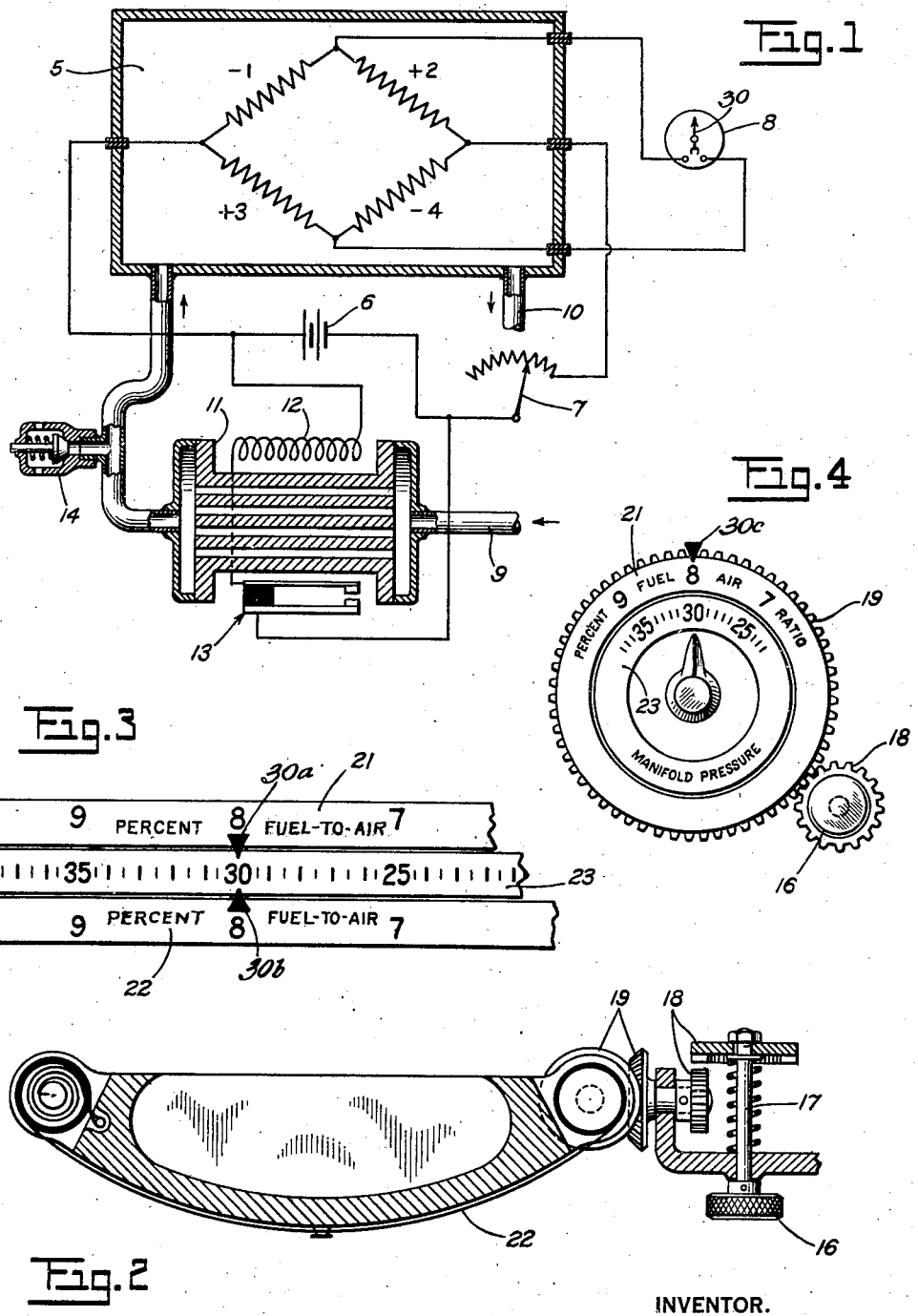
INVENTOR.
Dimitry E. Olshevsky
BY
Martin J. Finnegan
ATTORNEY.

April 18, 1939.  D. E. OLSHEVSKY  2,154,862
GAS ANALYSIS APPARATUS
Filed Feb. 12, 1937  2 Sheets-Sheet 2
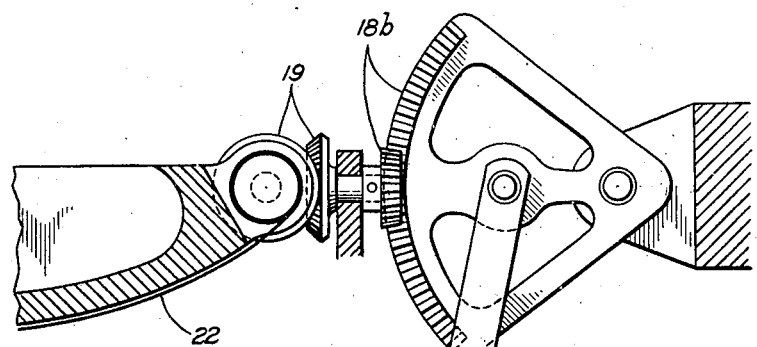
Fig. 5
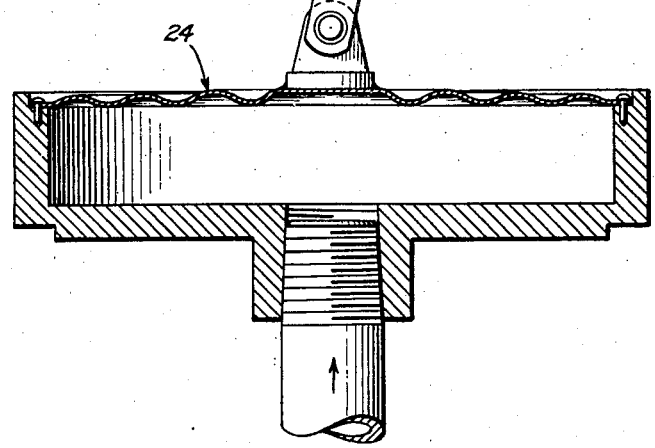
FROM INTAKE
MANIFOLD
INVENTOR.
Dimitry E. Olshevsky
BY
Martin J. Finnegan
ATTORNEY.

Patented Apr. 18, 1939

2,154,862

UNITED STATES PATENT OFFICE 2,154,862

GAS ANALYSIS APPARATUS

Dimitry E. Olshevsky, East Orange, N. J., assignor to Eclipse Aviation Corporation, East Orange, N. J., a corporation of New Jersey Application February 12, 1937, Serial No. 125,494

6 Claims. (Cl. 73—51)

This invention relates to gas analysis apparatus and particularly to means for indicating the composition of the fuel mixture being supplied to one or more internal combustion engines, as for example, the ratio between the amount of air and the amount of fuel in the said mixture.

An object of the invention is to determine the air-fuel ratio by a means, operating upon the principle that to a definite air-fuel ratio corresponds a practically definite composition of the exhaust gases and, furthermore, that there exists a definite relationship between the fuel air ratio of the intake and the heat conductivity of the exhaust gases. In this respect the invention includes certain improvements upon and additions to the system disclosed in Patent No. 2,025,121 granted to Clarke C. Minter, December 24, 1935.

As pointed out in the Minter patent specification a linear relation exists between the air-fuel ratio of a fuel mixture and the thermal conductivity of the resulting exhaust gases, which relationship can be accordingly indicated through a device such as a galvanometer which will indicate the extent of a potential difference resulting between certain conductors in accordance with the variations in thermal conductivity of the gas which surrounds said conductors, it being known that an electrically heated wire, when supplied with electrical energy at a substantially constant rate, will acquire a temperature which will vary in inverse ratio to the degree of change in conductivity of a gas surrounding such wire.

Existing methods of determining the fuel-to-air ratio on the above general principle comprise an apparatus having a plurality of wire conductors connected so as to constitute branches in a Wheatstone bridge, said conductors being heated by means of an electric current. At least one, and preferably two conductors composing opposite branches are confined within a standard gas of known composition or properties.

I found that it is not necessary to surround the resistances constituting one or two opposite legs of a Wheatstone bridge arrangement by a standard gas or to shield them from the gas to be tested in order to obtain reliable gas analysis data, but that all four conductors may be immersed in the gas to be tested. Such an arrangement has the advantage of simplicity and is useful in case of airplane motor gases where the gas pressure changes considerably with altitude.

As a further improvement I may include means for keeping or bringing the gaseous mixture at or to a certain predetermined temperature, automatically maintained; or I may include, jointly with or separately from the above mentioned temperature controlling means—means for controlling and standardizing the pressure of the entering gaseous mixture, to enhance precision of gas analysis.

Another object of the invention is to provide means for insuring a true indication of the actual air-fuel ratio as such indications may be rendered invalid by reasons of changes in the intake manifold pressure of the engine or engines being supplied with the fuel. In this respect, I am able to eliminate errors in previous systems due to the failure of the indicating apparatus to compensate for that proportion of the change in galvanometer deflection which resulted merely from a variation in the manifold pressure and not from any actual change in fuel-to-air proportions. In achieving this purpose I propose to employ a scale or scales having indications thereon within the range of expected air-fuel ratios, which scales may be adjusted by displacing same bodily so as to provide for variation in initial setting and readings in accordance with any variation occurring in manifold pressure, with the result that the movement of the galvanometer needle will indicate the real fuel-to-air ratio, taking into account the changes producing differences in the amount of carbon dioxide and hydrogen in the exhaust gases, but compensating for the proportion in the above differences due to manifold pressure variations. The indications will be thus subject only to the negligible error which will be due to the fact that the relationship of manifold pressure variation to the fuel-to-air ratio is not precisely a straight line function for the entire range of variation although sufficiently near to a straight line for all practical purposes.

The displacement of the scales may be performed either automatically or manually for which purposes the instrument may contain additional scales with indications within the expected manifold pressure range. In the preferred embodiment as shown I have indicated means of incorporating this feature in a single instrument which may indicate the true fuel-to-air ratio existing in two distinct aircraft engines, the arrangement being such that a single fixed scale having markings thereon to indicate possible range of variation in manifold pressure is correlated with two movable scales, one for each engine, which may be caused to be either manually or automatically actuated by the manifold pressure existing in the respective engines by means of conventional pressure responsive devices so as to shift said scales with respect to the fixed scales by a distance coresponding to the amount of the change in ratio which is due to variation in manifold pressure, the remaining portion of the change in ratio to correspond to the extent of movement of the index element hereinabout described, and the true or practically true fuelto-air ratio to be indicated by the pointers against the movable scales.

These and other objects of the invention will become apparent from inspection of the following specification when read with reference to the accompanying drawings wherein is illustrated the preferred embodiment of the invention. It is to be expressly understood, however, that the drawings are for the purpose of illustration only, and are not designed as a definition of the limits of the invention, reference being had to the appended claims for this purpose.

In the drawings:

Fig. 1 is a diagrammatic view of a system embodying the invention;

Figs. 2, 3, and 4 are detailed views of the scales employed in the indicating mechanisms of the system shown in Fig. 1 and showing the manual means for effecting the desired resetting in terms of manifold pressure to compensate for errors due to changes in manifold pressure.

Fig. 5 represents a schematic view of automatic means for effecting pressure compensation. Each scale is actuated, either directly or by means of a transferring mechanism (telemeter or similar), by a diaphragm, responsive to manifold pressure variations.

Referring principally to Fig. 1, reference character 9 indicates the point at which the exhaust gas may enter a compartment 5. Reference character 10 indicates the point of exit therefrom, these two points 9 and 10 being the only points in said compartment not hermetically sealed.

In the drawings all conductors are shown to be enclosed in a single compartment, 5, containing the gas to be analyzed. However, the invention refers also to the case when each of the conductors or each of either pairs of the conductors is placed in a separate compartment, as for example, if all the gas circulating through any and all of the compartments is the gas to be analyzed. All four conductors may be also mounted on a separate removable fixture, or otherwise, to facilitate production and repair.

A battery, 6, or some other source of direct (or alternating) current supplies electrical energy through a rheostat, 7, for heating the conductors 1, 2, 3 and 4. A voltmeter, 8, whose needle 30 actuates a marker cooperating with a scale 21 as indicated in Fig. 4, or with one of a plurality of scales as indicated at 21 and 22 in Fig. 3, there being as many of such scales and indicating instruments as there are engines to be investigated, the needle actuated marker for the scale 21 being indicated at 30a in Fig. 3 (or at 30c in Fig. 4) and that for the scale 22 being indicated at 30b in Fig. 3. Each scale is preferably calibrated (as shown in Figs. 3 and 4) directly in percentage of gas composition or calibrated to indicate the air-to-fuel ratio when internal combustion motors are investigated. It is to be understood that the apparatus shown in Fig. 1 is sufficient to actuate only a single marker (such as the marker 30a of Fig. 3, or the marker 30c of Fig. 4) and that said apparatus must be duplicated if there is a second engine to be investigated; the duplicate apparatus being, of course, connected to the duplicate marker, such as the marker 30b of Fig. 3, and the movement of each marker being synchronized with that of its associated galvanometer, corresponding to the galvanometer 8 of Fig. 1.

In my preferred embodiment, I have shown an electrically heated drilled block, 11, containing heating coils, 12, equipped with a conventional bimetal thermostatic switch, 13, as temperature standardizing means; and a simple, spring opposed release valve, 14, as a pressure standardizing means which may be used with or without a blower. But I desire to have it understood, that the particular means shown are only illustrative and that their purpose can be accomplished by various other means known to the art, such as, for instance, forced cooling and supercharging.

Referring to the wire conductors, those marked #1 and #4 are preferably made of a wire possessing a low, zero or negative thermal coefficient of resistivity such as manganin, an alloy of nickel, manganese, and copper while #2 and #3 are made of a wire having a high temperature coefficient of resistivity such as iron, lead or platinum.

In operation, all four conductors, 1, 2, 3 and 4 are heated by an electric current supplied by source 6. A gas of known or standard composition is previously circulated for calibration purposes only, through the container 5. Rheostats (not shown) located without or within the gas container, may be used, if desired, to adjust the galvanometer reading (galvanometer 8) to any chosen and suitably marked point of its scale. Since this adjustment is in the nature of a calibration, ordinarily it would not be required to change it during the life of the instrument.

It will be now readily seen that when a gas containing a larger percentage of high heat conductivity, high thermal capacity constituents (such as hydrogen); or containing a smaller percentage of low heat conductivity, low thermal capacity constituents (such as carbon dioxide) or both,—is caused to circulate through container 5—the temperature of all wires will decrease; but that only the conductors #2 and #3 will have their resistance appreciably changed.

The result of the above will be a change in the current flowing through the voltmeter 8, and consequently, a change in the position of its pointer. This position may be suitably marked on the scale.

On the other hand, if a gas containing a smaller percentage of high heat conductivity, high thermal capacity constituents and/or containing a larger percentage of low heat conductivity, low thermal capacity constituents—is caused to circulate through container 5, the temperature of all wires will increase, but only conductors #2 and #3 will have their resistance appreciably changed. The change will be now opposite to that of the first case.

The result will be a change in the current flowing through the voltmeter, the effect being substantially the reverse of the first case. The position of the pointer may be again marked on the scale.

The composition of the gas can be thus ascertained from the reading of the voltmeter or any other electrical instrument responsive to the variation in the difference of resistance between sets of conductors 1, 4, and 2, 3.

In order that this reading of the voltmeter may indicate the true fuel-to-air ratio notwithstanding possible variations in intake manifold pressure, I provide as shown in Figs. 2, 3 and 4, a setting knob 16 and shaft 17 and gears 18 and 19 connecting therewith, for shifting the movable scales 21, 22, in relation to the fixed scale 23, on which the manifold pressures are indicated, in Fig. 3 as spaced equally along each of the two scales which indicate the fuel-to-air ratio may assume successively new positions corresponding to each successive change in manifold pressure; the amount of such correctional shifting (re-setting) that is necessary for any given change in manifold pressure being readily observable by reference to the markings on the juxtaposed fixed scale which is graduated in terms of the various manifold pressures that may be encountered at the intakes of the particular engines. If desired, the gears 18b and 19 as shown separately on Fig. 5 are caused to turn by applying to one of them a Bourden tube or diaphragm 24 similar to that employed in the ordinary steam pressure gauge and having communication with the intake manifold of the engine whereby, as already explained, changes in manifold pressure will automatically re-set the movable scales with relation to the fixed scale so that the marking indicated on the scales by the movement of the index element of Fig. 1 will be a true representation of the fuel-to-air ratio under the existing manifold pressure condition. In the following claims all references to conductors with a low thermal coefficient of resistivity are intended to include conductors with zero or negative coefficients as well as those having low positive coefficients.

What is claimed is:

1. In an apparatus for the analysis of a gaseous mixture, a chamber adapted for gas circulation therein, a plurality of conductors of high thermal coefficient of resistivity, a plurality of conductors with low thermal coefficient of resistivity, all of said conductors being exposed to the gaseous mixture being analyzed, a source of electric current connected with said conductors whereby the conductors are heated at a predetermined rate, an electrically controlled measuring instrument responsive to the variation of the difference in resistances of each set of conductors or a function thereof, and adjustable means for adjusting and maintaining the instrument in adjustment to produce true measurements notwithstanding variations in the conditions to which the gaseous mixture may be subjected.

2. In an apparatus for the analysis of a gaseous mixture, a chamber adapted for gas circulation therein, a plurality of conductors of high thermal coefficient of resistivity, a plurality of conductors with low thermal coefficient of resistivity, all of said conductors being exposed to the gaseous mixture being analyzed, a source of electric current connected with said conductors whereby the conductors are heated at a predetermined rate, an electrically controlled measuring instrument responsive to the variation of the difference in resistances of each set of conductors or a function thereof, and adjustable manual means for adjusting and maintaining the instrument in adjustment to produce true measurements notwithstanding variations in the conditions to which the gaseous mixture may be subjected.

3. An apparatus for analysis of gaseous mixtures comprising a chamber adapted for gas circulation therein, a plurality of conductors with high thermal coefficient of resistivity, a plurality of conductors with low thermal coefficient of resistivity, both said sets of conductors being exposed to the gaseous mixture being analyzed, a source of electric supply connected with said conductors whereby said conductors are heated at a predetermined rate, means for automatically keeping the temperature and pressure of the gas to be analyzed at a predetermined constant value, an electrically controlled measuring instrument responsive to the variation of the difference in resistances between each set of conductors, said instrument indicating the composition of the gaseous mixture or a function of said composition, and adjustable means for adjusting and maintaining the instrument in adjustment to produce true measurements notwithstanding variations in the conditions to which the gaseous mixture may be subjected.

4. A fuel-to-air ratio indicating apparatus for use in a system adapted for gas circulation, comprising a plurality of conductors of high thermal coefficient of resistivity, a plurality of conductors with low thermal coefficient of resistivity, all of said conductors being exposed to the gaseous mixture being analyzed, a source of electric current connected with said conductors whereby the conductors are heated at a predetermined rate, an electrically controlled measurement instrument responsive to the variation of the difference in resistances of each set of conductors or a function thereof, said instrument indicating the fuel-to-air ratio or a function thereof, and adjustable means for adjusting and maintaining the instrument in adjustment to produce true measurements notwithstanding variations in the conditions to which the mixture of fuel and air may be subjected.

5. A fuel-to-air ratio indicating apparatus for use in a system adapted for gas circulation, comprising a plurality of conductors of high thermal coefficient of resistivity, a plurality of conductors with low thermal coefficient of resistivity, all of said conductors being exposed to the gaseous mixture being analyzed, a source of electric current connected with said conductors whereby the conductors are heated at a predetermined rate, an electrically controlled measurement instrument responsive to the variation of the difference in resistances of each set of conductors or a function thereof, said instrument indicating the fuel-to-air ratio or a function thereof, and adjustable manual means for adjusting and maintaining the instrument in adjustment to produce true measurements notwithstanding variations in the conditions to which the mixture of fuel and air may be subjected.

6. A fuel-to-air ratio indicating apparatus comprising a chamber adapted for gas circulation therein, a plurality of conductors with high thermal coefficient of resistivity, a plurality of conductors with low thermal coefficient of resistivity, both said sets of conductors being exposed to the gaseous mixture being analyzed, a source of electric supply connected with said conductors whereby said conductors are heated at a predetermined rate, means for automatically keeping the temperature and pressure of the gas to be analyzed at a predetermined constant value, an electrically controlled measuring instrument responsive to the variation of the difference in resistances between each set of conductors, said instrument indicating the fuel-to-air ratio or function thereof, and adjustable means for adjusting and maintaining the instrument in adjustment to produce true measurements notwithstanding variations in the conditions to which the gaseous mixture may be subjected.

DIMITRY E. OLSHEVSKY.